United States Patent
Wohlgemuth et al.

(10) Patent No.: US 11,561,146 B2
(45) Date of Patent: Jan. 24, 2023

(54) PRESSURE SENSOR SYSTEM HAVING PROTECTION AGAINST FREEZING MEDIUM

(71) Applicant: TDK Electronics AG, Munich (DE)

(72) Inventors: Christian Wohlgemuth, Berlin (DE); Benjamin Bohl, Berlin (DE)

(73) Assignee: TDK ELECTRONICS AG, Munich (DE)

( * ) Notice: Subject to any disclaimer, the term of this patent is extended or adjusted under 35 U.S.C. 154(b) by 14 days.

(21) Appl. No.: 16/762,079

(22) PCT Filed: Nov. 7, 2018

(86) PCT No.: PCT/EP2018/080497
§ 371 (c)(1),
(2) Date: May 6, 2020

(87) PCT Pub. No.: WO2019/092035
PCT Pub. Date: May 16, 2019

(65) Prior Publication Data
US 2020/0340874 A1  Oct. 29, 2020

(30) Foreign Application Priority Data
Nov. 8, 2017 (DE) .................... 10 2017 126 121.4

(51) Int. Cl.
*G01L 9/00* (2006.01)
*G01L 19/06* (2006.01)

(52) U.S. Cl.
CPC .......... *G01L 9/0052* (2013.01); *G01L 19/06* (2013.01)

(58) Field of Classification Search
CPC .... G01L 9/0052; G01L 19/06; G01L 19/0627
See application file for complete search history.

(56) References Cited

U.S. PATENT DOCUMENTS

| 4,321,908 | A | * | 3/1982 | Reed | ......................... E03B 7/10 138/28 |
| 5,249,469 | A | * | 10/1993 | Jonsson | ................ G01L 9/0072 361/283.4 |
| 5,412,994 | A | * | 5/1995 | Cook | ................... G01L 19/0038 73/708 |

(Continued)

FOREIGN PATENT DOCUMENTS

| CN | 1172949 A | 2/1998 |
| CN | 101611299 A | 12/2009 |

(Continued)

*Primary Examiner* — Tran M. Tran
(74) *Attorney, Agent, or Firm* — Slater Matsil, LLP

(57) ABSTRACT

In an embodiment, a pressure sensor system includes a pressure sensor element with a flexible plate, wherein the pressure sensor element is a piezoresistive sensor element and a support element on which the pressure sensor element is arranged, wherein a flow channel configured to supply a medium to the flexible plate runs in the support element, wherein the flow channel has at least one sub-section, a longitudinal direction of which running perpendicularly below the flexible plate, and wherein a channel cross section of the at least one sub-section of the flow channel is at no point within the sub-section of the flow channel smaller than an area of the flexible plate.

16 Claims, 2 Drawing Sheets

(56) References Cited

U.S. PATENT DOCUMENTS

| | | | | |
|---|---|---|---|---|
| 5,538,043 | A | * | 7/1996 | Salazar ............... E03B 7/10 138/28 |
| 5,644,285 | A | * | 7/1997 | Maurer ............... G01L 9/0052 338/39 |
| 5,792,958 | A | * | 8/1998 | Speldrich ............ G01L 19/06 338/42 |
| 5,925,824 | A | | 7/1999 | Soma et al. |
| 6,009,906 | A | * | 1/2000 | Salazar ............... E03B 7/10 138/28 |
| 6,119,729 | A | * | 9/2000 | Oberholzer ........... E03B 7/10 138/28 |
| 6,338,364 | B1 | * | 1/2002 | Mendenhall .......... E03B 7/10 138/28 |
| 6,626,044 | B1 | * | 9/2003 | Haji-Sheikh ....... G01L 19/0654 361/283.4 |
| 7,089,962 | B2 | * | 8/2006 | Bleeck ............... F16K 17/04 138/30 |
| 7,093,493 | B2 | * | 8/2006 | Benzel ............... G01L 9/0055 257/419 |
| 7,287,433 | B2 | | 10/2007 | Tanaka |
| 7,967,029 | B2 | * | 6/2011 | Baur ................ H01M 8/04171 138/33 |
| 8,051,719 | B2 | * | 11/2011 | Bigliati ............. G01L 9/0052 73/756 |
| 8,250,925 | B2 | * | 8/2012 | Benzel ............... G01L 19/0627 73/715 |
| 8,453,513 | B2 | * | 6/2013 | Bigliati ............. G01L 9/0052 73/756 |
| 8,552,514 | B2 | * | 10/2013 | Ooya ................ G01L 9/0054 257/419 |
| 8,590,387 | B2 | * | 11/2013 | Crivelli ............. G01L 9/0073 73/724 |
| 8,643,127 | B2 | * | 2/2014 | Dangtran ............ B81B 7/0019 257/415 |
| 8,733,175 | B2 | | 5/2014 | Ooya |
| 8,757,668 | B2 | * | 6/2014 | Haeckel ............. F16L 51/00 138/28 |
| 9,291,514 | B2 | | 3/2016 | Wohlgemuth |
| 9,371,633 | B2 | * | 6/2016 | Salazar ............... E03B 7/12 |
| 9,534,975 | B2 | * | 1/2017 | Kachenko ........... G01L 19/146 |
| 9,618,406 | B2 | | 4/2017 | Kroeger et al. |
| 10,488,289 | B2 | * | 11/2019 | Liu ................... G01L 19/04 |
| 11,105,700 | B2 | * | 8/2021 | Choi ................. G01L 19/0069 |
| 11,428,593 | B2 | * | 8/2022 | Bhat ................. G01L 19/0618 |
| 2010/0011871 | A1 | | 1/2010 | Marco et al. |
| 2010/0064670 | A1 | * | 3/2010 | Starck ............... F16L 51/00 219/202 |
| 2011/0098947 | A1 | | 4/2011 | Fattah |
| 2011/0138924 | A1 | | 6/2011 | Paolo et al. |
| 2011/0174080 | A1 | | 7/2011 | Mauro et al. |
| 2012/0042734 | A1 | | 2/2012 | Richard et al. |
| 2015/0377734 | A1 | * | 12/2015 | Ihle .................. C04B 35/64 73/706 |
| 2017/0350778 | A1 | | 12/2017 | Costanzo et al. |
| 2018/0209865 | A1 | * | 7/2018 | Reinhard ............ G01L 13/025 |

FOREIGN PATENT DOCUMENTS

| | | |
|---|---|---|
| CN | 102112856 A | 6/2011 |
| CN | 102124313 A | 7/2011 |
| CN | 104101456 A | 10/2014 |
| CN | 105115657 A | 12/2015 |
| CN | 107250752 A | 10/2017 |
| DE | 102006028673 A1 | 12/2006 |
| DE | 102007036272 A1 | 2/2009 |
| DE | 202007015980 U1 | 3/2009 |
| DE | 102008026611 A1 | 12/2009 |
| DE | 102012204414 A1 | 9/2012 |
| EP | 2975375 A1 | 1/2016 |
| EP | 2993453 A1 | 3/2016 |
| JP | S57171235 A | 10/1982 |
| JP | S6056244 U | 4/1985 |
| JP | H1038728 A | 2/1998 |
| JP | 2008241327 A | 10/2008 |
| JP | 2015001443 A | 1/2015 |
| WO | 2010013216 A1 | 2/2010 |
| WO | 2012089625 A2 | 7/2012 |

* cited by examiner

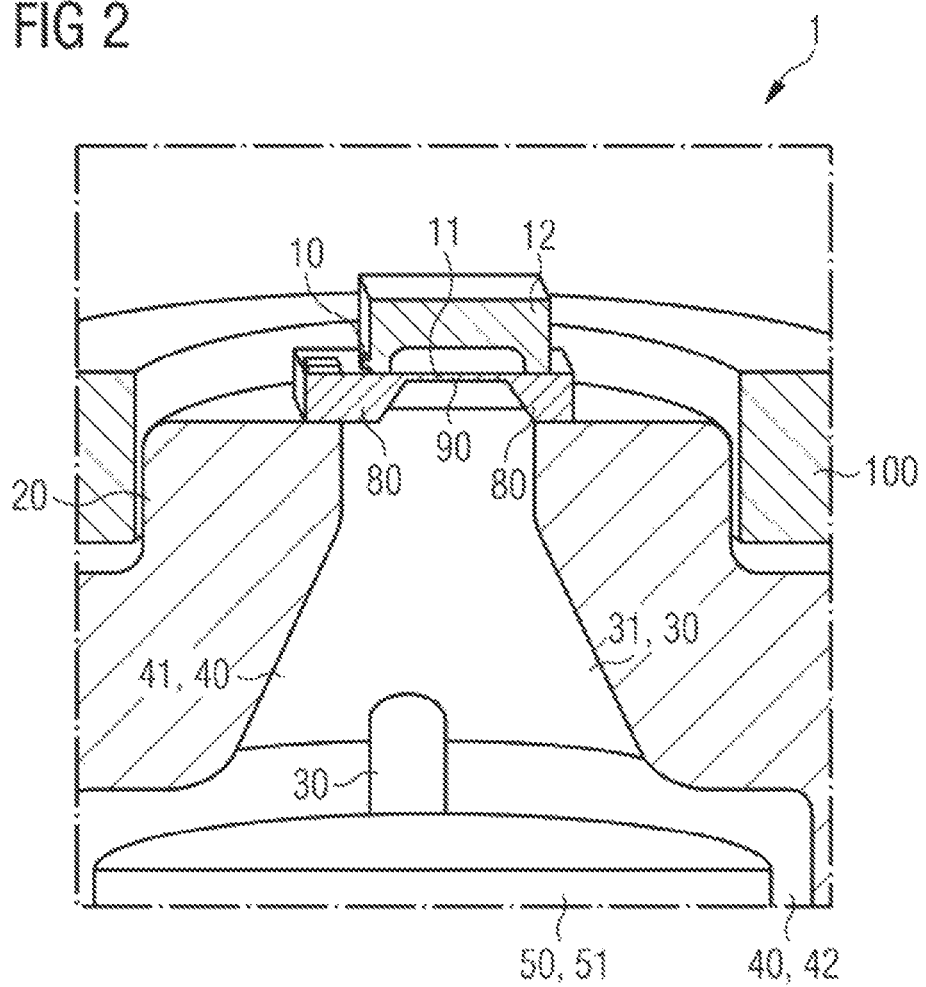

PRESSURE SENSOR SYSTEM HAVING PROTECTION AGAINST FREEZING MEDIUM

This patent application is a national phase filing under section 371 of PCT/EP2018/080497, filed Nov. 7, 2018, which claims the priority of German patent application 102017126121.4, filed Nov. 8, 2017, each of which is incorporated herein by reference in its entirety.

TECHNICAL FIELD

The invention relates to a pressure sensor system which is protected against destruction by a freezing medium.

BACKGROUND

In order to measure pressures in an aqueous solution, for example, in water or a urea solution, a pressure sensor system can include a piezoresistive pressure sensor element. A pressure sensor element of this type comprises a membrane in the shape of a flexible plate. The pressure sensor element is coupled to a flow channel in such a way that a medium, for example, the above-mentioned aqueous solutions, flow to the membrane/flexible plate. Depending on the pressure of the medium, the flexible plate is deflected. Depending on the pressure of the medium or the bending of the flexible plate, a change in resistance can be measured at connecting contacts of the pressure sensor element.

In the piezoresistive pressure sensor system described above, the flexible plate or membrane can be formed as a thin layer. If the pressure sensor system is in a cold environment, there is a risk that the medium in the flow channel, which is coupled to the flexible plate/membrane, will freeze. It is therefore necessary to prevent the freezing medium from splitting or damaging the thin membrane, which would lead to the pressure sensor system being destroyed.

SUMMARY OF THE INVENTION

Embodiments provide a pressure sensor system in which a pressure sensor element of the pressure sensor system is protected against destruction by a freezing medium.

The pressure sensor system comprises a pressure sensor element with a flexible plate, wherein the pressure sensor element is formed as a piezoresistive sensor element. Moreover, the pressure sensor system comprises a support element on which the pressure sensor element is arranged. A flow channel for supplying the medium to the flexible plate of the pressure sensor element runs in the support element. The flow channel has at least one sub-section, the longitudinal direction of which runs perpendicularly below the flexible plate of the pressure sensor element. The medium consequently flows perpendicularly to the flexible plate from the sub-section of the flow channel arranged directly below the flexible plate. The channel cross section of this at least one sub-section of the flow channel is at no point within the sub-section of the flow channel smaller than the area of the flexible plate of the pressure sensor element.

This means that the at least one sub-section of the flow channel does not have an undercut at any point within the sub-section of the flow channel. At no point of the at least one sub-section of the channel does a bottleneck, for example, in the form of a material projection which is located inside the flow channel in a projection area of the flexible plate of the pressure sensor element, protrude into the flow channel. In particular, there is no counter bearing in the flow channel on which a medium, which expands during freezing, could be supported. The flow channel therefore does not have an undercut.

In the event of the medium freezing, no pressures can consequently build up in the flow channel which cause the medium to press against the flexible plate. Instead, the flow channel is formed in such a way that pressures which build up in the flow channel following the freezing of the medium are diverted in the opposite direction of the pressure sensor element, i.e., away from the pressure sensor element.

The at least one sub-section of the flow channel which is arranged below the pressure sensor element can widen, but under no circumstances narrow, in the longitudinal direction, in the opposite direction of the flexible plate of the pressure sensor element, for example. It is essential that in the sub-section of the flow channel located below the flexible plate there is no material projection present which is located in a plane of the at least one sub-section of the flow channel parallel to the area of the flexible plate/membrane of the pressure sensor element.

According to a more extensive embodiment, a compressible element can be installed in a hollow space of the support element below the at least one sub-section of the flow channel. In the event of the medium freezing in the at least one sub-section perpendicularly below the flexible plate of the pressure sensor element, the expanding medium presses against the compressible element. The compressible element can be a closed-cell foam, in particular a silicone foam, for example. The compressible element acts as protection against freezing and, owing to its compressible characteristic, prevents a solid abutment from arising below the at least one sub-section of the flow channel during the ice formation during freezing of the medium.

In order to minimize the height of the ice column which acts perpendicularly on the flexible plate of the pressure sensor element below the flexible plate in the event of the medium freezing, the medium can be supplied in the support element via angled flow channels. A part of the media supply channels can be located in the housing of the pressure sensor, according to a variant of the embodiment of the pressure sensor system.

The proposed pressure sensor system makes it possible to reduce the components and process steps by intentionally avoiding an oil-filled system and the pressure sensor element still being able to be incorporated into a freezing-resistant sensor system. A further advantage is that the structure of the pressure sensor system makes it possible for it to be incorporated into a housing typical for automotive applications.

BRIEF DESCRIPTION OF THE DRAWINGS

The invention is explained in greater detail hereinafter using figures which show exemplary embodiments of the present invention. In the figures:

FIG. 2 shows an enlarged detail view of a cutout of the pressure sensor system from FIG. 1.

DETAILED DESCRIPTION OF ILLUSTRATIVE EMBODIMENTS

Figure 1:
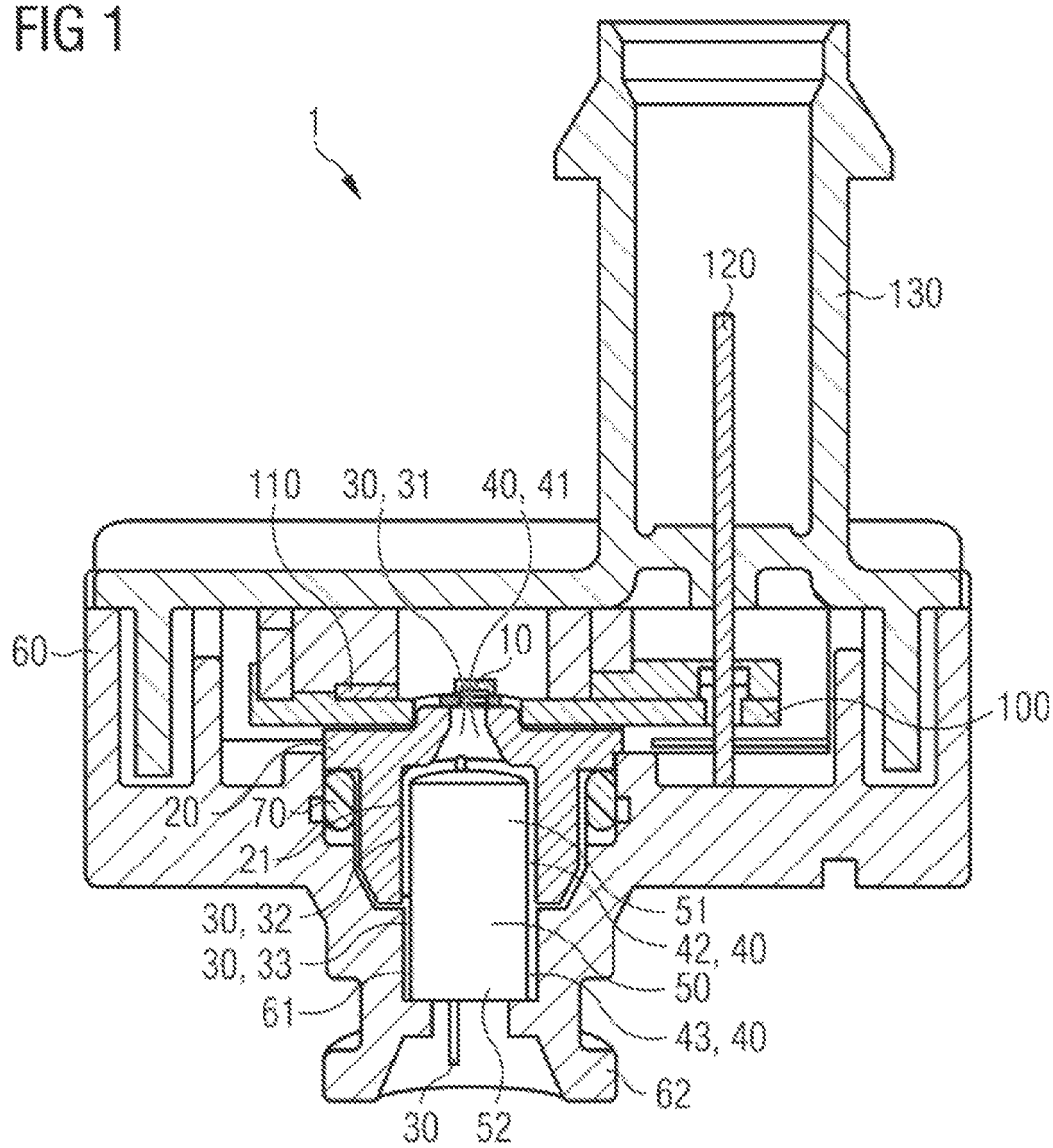
FIG. 1 shows a general view of a pressure sensor system in a sectional drawing.

The different components of a pressure sensor system 1 having protection against a freezing medium are described in greater detail using FIGS. 1 and 2. The pressure sensor system 1 comprises a pressure sensor element 10 with a flexible plate or membrane 11. The pressure sensor element 10 is formed as a piezoresistive sensor element. When pressure is put on the flexible plate 11, this causes a deformation of the flexible plate which leads to a measurable change in resistance to the piezoresistive resistors. Moreover, the pressure sensor system comprises a support element 20 on which the pressure sensor element 10 is arranged.

A flow channel 30 for ensuring the media supply to the sensor element 10 and in particular to the flexible plate 11 runs in the support element 20. The flow channel 30 has at least one sub-section 31, the longitudinal direction of which runs perpendicularly below the flexible plate 11. The medium which flows in the at least one sub-section 31 can thus flow perpendicularly to the flexible plate 11. The pressure sensor system is structured in such a way that a channel cross section of the at least one sub-section 31 of the flow channel 30 is at no point within this sub-section 31 smaller than the area of the flexible plate 11.

The design of the media supply in the region of the pressure-sensitive element 10 is selected in such a way that there is no undercut present in the sub-section 31 of the flow channel 30 up to the sensitive structure/flexible plate 11. This means that at no point of the at least one sub-section 31 of the flow channel 30 does a material projection protrude into the flow channel which is located inside the flow channel in a projection area of the flexible plate 11. For example, as can be seen in FIGS. 1 and 2, there is no material projection in the at least one sub-section 31 of the flow channel 30 which extends into the flow channel, indeed in perpendicular projection to the flexible plate up to below the flexible plate, at a point of the sub-section 31 of the flow channel from a side wall of the flow channel, at a distance to the flexible plate 11.

In particular, there is no structural element which protrudes into the flow channel as an undercut in the at least one sub-section 31 of the flow channel, which is located perpendicularly below the flexible plate 11. This prevents a solid abutment from arising perpendicularly below the flexible plate 11 inside the sub-section 31 of the flow channel, on which solid abutment a freezing medium could be supported and thus could press against the flexible plate 11 in the event of a volume expansion. Owing to the configuration of the flow channel 30 without an undercut, it is thus possible to prevent a freezing medium from damaging the flexible plate 11 and from possibly bursting from its base.

The pressure sensor system has a hollow space 40 with a first region 41 and with a second region 42 which connects thereto. The first region 41 and the second region 42 of the hollow space run inside the support element. The hollow space 40 is encompassed by an inner wall 21 of the support element 20 inside the support element 20. According to the embodiment of the pressure sensor system shown in FIGS. 1 and 2, the first region 41 of the hollow space tapers in a funnel-like manner in the direction of the flexible plate 11 of the pressure sensor element 10. The at least one sub-section 31 of the flow channel 30 is formed by this first region 41 of the hollow space 40. As a result, the at least one sub-section 31 of the flow channel 30 also tapers in a funnel-like manner in the direction of the flexible plate 11 of the pressure sensor element. The second region 42 of the hollow space 40 is instead cylindrical in shape.

In the support element 20, a longitudinal direction of the first and second region 41, 42 of the hollow space 40 extends perpendicularly to the area of the flexible plate 11 of the pressure sensor element 10. As can be seen from FIGS. 1 and 2, a cross-sectional area of the first region 41 of the hollow space 40 is at least as large as the area of the flexible plate 11 of the pressure sensor element 10 at each position along the longitudinal direction of the first region 41 of the hollow space 40. A cross-sectional area of the second region 42 of the hollow space 40 is larger than the area of the flexible plate 11 of the pressure sensor element 10 at each position along the longitudinal direction of the second region 42 of the hollow space 40. The hollow space 40 thus widens increasingly from a region directly below the flexible plate 11 in the direction of the more remote regions.

According to a possible embodiment, the pressure sensor system 1 comprises a compressible element 50 which is arranged in the second region 42 of the hollow space 40. The compressible element 50 is formed to be compressed by the medium during the freezing of the medium. In particular, the compressible element can be formed as a closed-cell foam, for example, as a silicone foam. By incorporating the compressible element 50 into the hollow space 40, in particular the second region 42 of the hollow space 40, a solid abutment in the hollow space 40 or in the flow channel 30 can be prevented during the freezing of the medium.

According to the embodiment of the pressure sensor system 1 shown in FIGS. 1 and 2, the compressible element 50 is cylindrical in shape. The compressible element 50 is arranged in the second region 42 of the hollow space 40 below the first region 41 of the hollow space. The compressible element 50 thus forms a closure to the region below the sensitive element 10. In particular, the compressible element 50 can be arranged centrally below the funnel-shaped first region 41 of the hollow space 40 or the funnel-shaped sub-section 31 of the flow channel 30.

A cross-sectional area of the second region 42 of the hollow space 40 is larger than the cross-sectional area of the opening of the funnel-shaped first region 41 of the hollow space. Moreover, a cross-sectional area of the compressible element 50 is at least as large as the cross-sectional area of the opening of the funnel-shaped first region 41 of the hollow space 40. Especially in the embodiment of the pressure sensor system shown in FIGS. 1 and 2, the cross-sectional area of the compressible element 50 is larger than the cross-sectional area of the opening of the funnel-shaped first region 41 of the hollow space 40. The first region 41 of the hollow space 40 is thus closed by the compressible element 50. As can further be seen in FIGS. 1 and 2, the cross-sectional area of the compressible element 50 is smaller than the cross-sectional area of the second region 42 of the hollow space 40.

The flow channel 30 has at least one further sub-section 32 in the support element 20, which sub-section connects to the at least one sub-section 31 of the flow channel. The further sub-section 32 of the flow channel 30 is located between the compressible element 50, in particular an outer surface of the compressible element 50, and an inner wall 21 of the support element 20, which inner wall delimits the second region 42 of the hollow space 40. In the region 42 of the hollow space, an outer surface of the compressible element 50 thus represents a lateral closure to the media supply channels 30.

Since the flow channel is formed in the second region 42 of the hollow space between the inner wall 21 of the support element 20 and the outer surface of the compressible element 50, angled channels are created in the pressure sensor system for supplying the media. In the event of the medium freezing, the height of the ice column below the pressure sensor element 10 is thus minimized.

The pressure sensor system 1 further comprises a housing 60 in which the pressure sensor element 10 and the support element 20 are arranged. The flow channel 30 as well as the hollow space 40 extend into the housing 60. The support element 20 can be connected to the housing 60 via a radial sealing system. In the embodiment of the pressure sensor system depicted in FIG. 1, a sealing element 70 is present between the support element 20 and the housing 60 of the pressure sensor. The sealing element 70 can be formed as an O ring, for example.

In addition to the first and second region 41, 42, the hollow space 40 has a further third region 43 which connects to the second region 42 of the hollow space 40. The third region 43 is encompassed by an inner wall 61 of the housing 60. The compressible element 50 has a first section 51 which is arranged in the second region 42 of the hollow space 40. Moreover, the compressible element 50 has a second section 52 which is arranged in the third section 43 of the hollow space 40. The cross-sectional area of the second section 52 of the compressible element 50 corresponds to the cross-sectional area of the first section 51 of the compressible element. The compressible element is therefore formed as a compressible body which is cylindrical in shape and which is arranged in the second region 42 and in the third region 43 of the hollow space 40.

The cross-sectional area of the second section 52 of the compressible element 50 is smaller than the cross-sectional area of the third region 43 of the hollow space 40. As a result, a sub-section 33 of the flow channel 30, which sub-section extends into the housing 60, is formed which runs between the second section 52 of the compressible element 50, in particular the outer surface of the second section 52 of the compressible element, and the inner wall 61 of the housing 60, which inner wall delimits the third region 43 of the hollow space 40. The sub-section 33 of the flow channel 30 thus also runs in the housing 60. In order to introduce the medium into the flow channel 30, the housing 60 has a pressure connection 62.

By incorporating the media supply channels into the sensor housing 60 and into the support element 20, the compressible element 50 can be created with a simple shape, for example, 2½ dimensional with the cylindrical shape shown in FIG. 1. The shape and design of the support element 20 and the housing 60 are selected in such a manner that typically large tolerances of the compressible element 50 in the pressure and temperature range do not restrict the function.

The housing 60 can be formed as a plastics material housing. The pressure sensor element 10 can be formed from silicon. The support element 20 preferably has a ceramic material. An additional glass counter body can be dispensed with between the silicon sensor element 10 and the ceramic support element 20 if the thermal expansion coefficient of the support element 20 is adjusted to the silicon of the pressure sensor element 10. As a result, there is no undercut at the sensor element plane. The pressure sensor element 10 can be coupled to the support element 20 with a mechanically strong and media-resistant connecting material. In particular, the pressure sensor element 10 can be connected to the support element 20 by a glass solder layer 80. In contrast to metallic soldering, a metallization of the support element 20 and the pressure sensor element 10 can be dispensed with by using a glass solder.

According to a possible embodiment, the rear side of the pressure sensor element 10 which faces the at least one sub-section 31 of the flow channel 30 can have a passivation layer 90. The flexible plate 11 can be protected against an aggressive medium, for example, a urea solution, by passivating the rear side of the sensor element 10 in this manner.

Depending on the embodiment, the pressure sensor system can be used for measuring an absolute pressure or a relative pressure. When measuring an absolute pressure, all pressures are referred to a pressure reference. A configuration of this type is shown in particular in FIG. 2. In the embodiment shown in FIG. 2, a glass cap 12 is arranged on the pressure sensor element 10, in particular over the flexible plate 11. There is a cavity between the flexible plate 11 and the glass cap 12, in which cavity a reference pressure, for example a vacuum, is present.

In contrast to absolute pressure measurement, the glass cap 12 is dispensed with in a pressure sensor element which is designed for measuring relative pressure. When measuring the relative pressure, the pressure of the measuring medium is measured relative to the ambient pressure. In this case, the pressure sensor system 1 is formed in such a way that the atmospheric pressure acts on the flexible plate 11 from above and the pressure of the medium acts on the flexible plate 11 from below.

According to a possible embodiment, the pressure sensor system 1 has a wiring support 100 which, with regard to the support element 20, is formed as a separate support or component body. The pressure sensor system 1 comprises a signal converter module 110 for evaluating the change in resistance of the pressure sensor element owing to the acting pressure of the medium. The signal converter module 110 amplifies, normalizes and compensates the temperature behavior. The pressure sensor system 1 comprises a contacting element 120 for external contacting, which contacting element is arranged in a plug housing 130.

In the embodiment of the pressure sensor system 1 shown in FIGS. 1 and 2, with a separate support element 20 and wiring support 100, the signal converter module 110 is arranged on the wiring support 100. The wiring support 100 is arranged on the support element 20. In particular, the support element 20 protrudes into a recess of the wiring support 100.

In particular in an embodiment with a wiring support 100 which is separate from the support element 20, there is great flexibility when selecting the material for the wiring support, since the wiring support does not have to be guided through the high temperatures which occur during the glass soldering process. Different interconnections and signal converter modules can be used on adapted wiring supports without changing the basic structure of the pressure sensor system. In particular, the support element 20 can remain unchanged with the flow channel 30. According to a different embodiment of the pressure sensor system 1, the separate wiring support 100 can be completely dispensed with. In this configuration, the electrical structural elements, in particular the signal converter module 110, are arranged directly on the support element 20 and are electrically connected via wire bond connections.

The invention claimed is:

1. A pressure sensor system comprising:
    a pressure sensor element with a flexible plate, wherein the pressure sensor element is a piezoresistive sensor element;
    a support element on which the pressure sensor element is arranged; and
    a hollow space having a first region and a second region connected thereto,
    wherein a flow channel configured to supply a medium to the flexible plate runs in the support element,
    wherein the flow channel has at least one sub-section, a longitudinal direction of which running perpendicularly below the flexible plate, wherein a channel cross section of the at least one sub-section of the flow channel is at no point within the sub-section of the flow channel smaller than an area of the flexible plate, wherein the first and second regions of the hollow space run in the support element and are encompassed by an inner wall of the support element, wherein the first region of the hollow space is a funnel-shaped first region that tapers towards the flexible plate of the pressure sensor element, wherein the at least one sub-section of the flow channel is formed by the first region of the hollow space, wherein a compressible element is arranged in the second region of the hollow space such that a further sub-section of the flow channel in the second region of the hollow space is formed between the inner wall of the support element and an outer surface of the compressible element along an entire circumference of the compressible element, and wherein the compressible element is configured to be compressed by the medium during freezing of the medium.

2. The pressure sensor system according to claim 1, wherein the at least one sub-section of the flow channel at no point within the at least one sub-section of the flow channel has an undercut.

3. The pressure sensor system according to claim 1, wherein the second region of the hollow space is cylindrical in shape.

4. The pressure sensor system according to claim 3,
wherein, in the support element, a longitudinal direction of the first and second regions of the hollow space extends perpendicularly to the area of the flexible plate of the pressure sensor element,
wherein a cross-sectional area of the first region of the hollow space is at least as large as the area of the flexible plate of the pressure sensor element at each position along the longitudinal direction of the first region of the hollow space, and
wherein a cross-sectional area of the second region of the hollow space is larger than the area of the flexible plate of the pressure sensor element at each position along the longitudinal direction of the second region of the hollow space.

5. The pressure sensor system according to claim 1, wherein the compressible element is cylindrical in shape and is arranged in the second region of the hollow space below the funnel-shaped first region of the hollow space.

6. The pressure sensor system according to claim 1,
wherein a cross-sectional area of the second region of the hollow space is larger than a cross-sectional area of an opening of the funnel-shaped first region of the hollow space,
wherein a cross-sectional area of the compressible element is at least as large as the cross-sectional area of the opening of the funnel-shaped first region of the hollow space, and
wherein the cross-sectional area of the compressible element is smaller than the cross-sectional area of the second region of the hollow space.

7. The pressure sensor system according to claim 1,
wherein the flow channel has at least one further sub-section in the support element,
wherein the further sub-section connects to the at least one sub-section of the flow channel,
wherein the further sub-section of the flow channel is located between the compressible element and the inner wall of the support element, and
wherein the inner wall delimits the second region of the hollow space.

8. The pressure sensor system according to claim 1, further comprising:
a housing in which the pressure sensor element and the support element are arranged,
wherein the flow channel and the hollow space extend into the housing, and
wherein a sealing element is arranged between the support element and the housing.

9. The pressure sensor system according to claim 8,
wherein the hollow space has a third region connecting to the second region of the hollow space and is encompassed by an inner wall of the housing,
wherein a first section of the compressible element is arranged in the second region of the hollow space and a second section of the compressible element is arranged in the third region of the hollow space, and
wherein a cross-sectional area of the second section of the compressible element is smaller than a cross-sectional area of the third region of the hollow space.

10. The pressure sensor system according to claim 9, wherein a sub-section of the flow channel, which sub-section extends into the housing, runs between the second section of the compressible element and the inner wall of the housing, and wherein the inner wall of the housing delimits the third region of the hollow space.

11. The pressure sensor system according to claim 1,
wherein the pressure sensor element is formed from silicon,
wherein the support element comprises a ceramic material, and
wherein the pressure sensor element is connected to the support element by a glass solder layer.

12. The pressure sensor system according to claim 1, wherein a rear side of the pressure sensor element which faces the at least one sub-section of the flow channel comprises a passivation layer.

13. The pressure sensor system according to claim 1, further comprising:
a signal converter module configured to generate an electrical signal depending on a pressure being put on the flexible plate of the pressure sensor element by the medium; and
a wiring support which is separate from the support element and on which the signal converter module is arranged,
wherein the wiring support is arranged on the support element.

14. The pressure sensor system according to claim 1, further comprising a signal converter module configured to generate an electrical signal depending on a pressure being put on the flexible plate of the pressure sensor element by the medium, wherein the signal converter module is arranged directly on the support element.

15. The pressure sensory system according to claim 1, wherein the pressure sensor system is configured to be protected against the freezing of the medium.

16. The pressure sensory system according to claim 1, wherein the compressible element comprises a closed-cell foam or a silicone foam.

* * * * *